(12) United States Patent
Marelas et al.

(10) Patent No.: US 11,061,780 B1
(45) Date of Patent: Jul. 13, 2021

(54) APPLYING MACHINE-LEARNING TO OPTIMIZE THE OPERATIONAL EFFICIENCY OF DATA BACKUP SYSTEMS

(71) Applicant: EMC IP Holding Company LLC, Hopkinton, MA (US)

(72) Inventors: Peter Marelas, Donvale (AU); Aruna Kolluru, Castle Hill (AU)

(73) Assignee: EMC IP Holding Company LLC, Yokneam (IL)

( * ) Notice: Subject to any disclaimer, the term of this patent is extended or adjusted under 35 U.S.C. 154(b) by 104 days.

(21) Appl. No.: 16/596,353

(22) Filed: Oct. 8, 2019

(51) Int. Cl.
   *G06F 11/14* (2006.01)
   *G06N 20/00* (2019.01)
   *G06F 17/18* (2006.01)

(52) U.S. Cl.
   CPC .......... *G06F 11/1464* (2013.01); *G06F 17/18* (2013.01); *G06N 20/00* (2019.01)

(58) Field of Classification Search
   None
   See application file for complete search history.

(56) References Cited

U.S. PATENT DOCUMENTS

| | | | | |
|---|---|---|---|---|
| 9,798,629 | B1 * | 10/2017 | Shilane | G06F 11/1464 |
| 10,083,095 | B1 * | 9/2018 | Chopra | G06F 11/1464 |
| 10,318,387 | B1 * | 6/2019 | Chopra | G06F 11/0709 |
| 2014/0143610 | A1 * | 5/2014 | Nakatsugawa | G06F 11/1461 714/47.3 |
| 2018/0032405 | A1 * | 2/2018 | Chen | G06F 11/0709 |
| 2019/0155695 | A1 * | 5/2019 | Protasov | G06F 11/1461 |
| 2020/0042398 | A1 * | 2/2020 | Martynov | G06N 20/00 |
| 2020/0250548 | A1 * | 8/2020 | Shwartz | G06N 5/045 |
| 2020/0257992 | A1 * | 8/2020 | Achin | G06N 5/04 |
| 2020/0364113 | A1 * | 11/2020 | Tormasov | G06F 11/1469 |

OTHER PUBLICATIONS

Song et al. (Scalable Data Analytics Platform for Enterprise Backup Management), pp. 7. ISBN: 978-1-4799-0913-1 IEEE (Year: 2014).*

* cited by examiner

*Primary Examiner* — Kaushikkumar M Patel
(74) *Attorney, Agent, or Firm* — Dergosits & Noah LLP; Todd A. Noah

(57) ABSTRACT

Applying machine-learning to optimize the operational efficiency of data backup systems is described. A machine-learning system creates a training set of multiple features for each of multiple historical data backup jobs. The machine-learning system trains a prediction model to predict, based on the training set, the probabilities that the corresponding historical data backup jobs failed during the next historical data backup window. The machine-learning system creates an operational set of multiple features for each of multiple scheduled data backup jobs. The trained prediction model predicts, based on the operational set, the probabilities that the corresponding scheduled data backup jobs will fail during the next scheduled data backup window. The predicted probability that a scheduled data backup job will fail during the next scheduled data backup window is output, thereby enabling an operator to remediate the scheduled data backup job prior to the next scheduled data backup window.

20 Claims, 6 Drawing Sheets

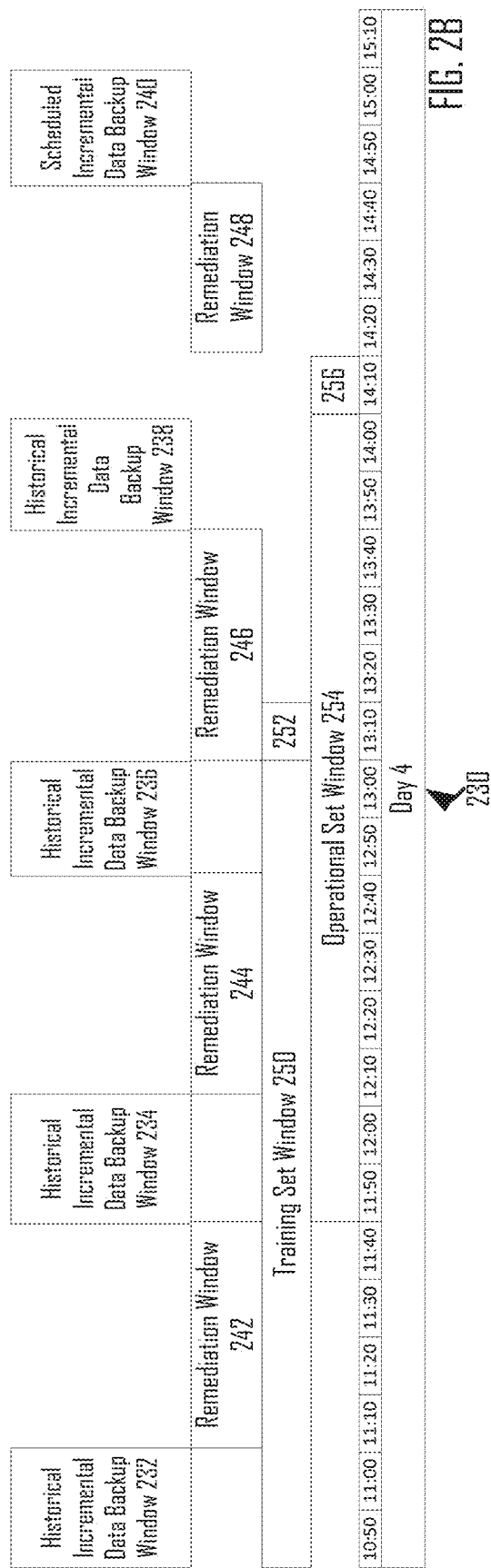

APPLYING MACHINE-LEARNING TO OPTIMIZE THE OPERATIONAL EFFICIENCY OF DATA BACKUP SYSTEMS

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired time when the data object was in this state, and then instructs the backup/restore application to execute a restore operation to restore a copy of the corresponding backup file(s) for that state to the data object.

A backup/restore application can create a full backup file for a data object by backing up all of the data in the data object. Typically, a full backup file is created at infrequent intervals. For example, each backup/restore application in a customer's data environment creates a full backup file of their database(s) each week between two times, such as from 6:00 P.M. Sunday to 6:00 A.M. Monday, which is a time period that may be referred to as a data backup window. A data object that was hacked up by a full backup file can be restored to a specified time by applying only the most recent full backup file prior to the specified time. For example, if on Saturday September $21^{st}$ a database system administrator requests the restoration of a client's database to its state on Thursday September $19^{th}$, a backup/restore application applies the client's full backup file created at 1:00 A.M. on Sunday September $15^{th}$. Additionally, or alternatively, a full backup file can serve as the reference point for subsequent differential backup files, incremental backup files, and/or transaction log backup files.

A backup/restore application can create a differential backup file for a data object by backing up the data that has changed in the data object since the last full backup file was created for the data object. As the elapsed time increases since the most recent full backup file, the accumulated changes increase in a data object, as does the time to create a differential backup file. For example, each backup/restore application in a customer's data environment creates a full backup file of their database(s) between 6:00 P.M. Sunday and 6:00 A.M Monday, and also creates a differential backup file of their database(s) between 6:00 P.M. and 6:00 A.M every remaining day. A data object that was backed up by a differential backup file can be restored to a specified time by applying the most recent full backup file prior to the specified time, and then applying only the most recent differential backup file prior to the specified time. For example, if on Saturday September $21^{st}$ a database system administrator requests the restoration of a client's database to its state on Thursday September $19^{th}$, a backup/restore application applies the full backup file created at 1:00 A.M. on Monday September $16^{th}$ and the differential backup file created at 1:30 A.M. on Thursday September $19^{th}$.

A backup/restore application can create an incremental backup file for a data object by only backing up data that is new or changed in the data object since the most recent previous backup file was created, which may have been a full backup file, a differential backup file, or another incremental backup file. Since an incremental backup file does not store duplicate copies of unchanged data, more backup files created at more points in time may be efficiently stored by organizing the data into increments of change between points in time. For example, each backup/restore application in a customer's data environment creates a full backup file of their database(s) between 6:00 P.M. Sunday and 6:00 A.M Monday, creates a differential backup file of their database(s) between 6:00 P.M. and 6:00 A.M every remaining day. and creates incremental backup files of their database(s) between 10 minutes before and 10 minutes after every hour from 6:00 A.M. until 6:00 P.M. Using an incremental backup file to restore a data object to a specified time can require applying the most recent full backup file prior to the specified time, possibly applying the most recent differential backup file that was created prior to the specified time, and then applying in turn each of the incremental backup files created since the most recent backup file prior to the specified time, through the most recent incremental backup file created prior to the specified time. For example, if on Saturday September $21^{st}$ a database administrator requests a restoration of a client's database to its state on Thursday September $19^{th}$ at 9:00 A.M., a backup/restore application identifies the client's full backup file created at 1:00 A.M. on Monday September $16^{th}$, the client's differential backup file created at 1:30 A.M. on Thursday September $19^{th}$, and the client's 3 incremental backup files created at 7:04 A.M, 7:58 A.M, and 9:06 A.M. on September $19^{th}$.

A backup/restore application can create a transaction log backup file for a data object by only backing up a history of actions executed by the data object's management system. The data object's management system can use a transaction log backup file to re-apply the changes made by committed transitions that are not materialized in a data object and roll back the changes to a data object that were made by uncommitted transactions. For example, each backup/restore application in a customer's data environment creates a full backup file of their database(s) between 6:00 P.M. Sunday and 6:00 A.M. Monday, creates a differential backup file of their database(s) between 6:00 P.M. and 6:00 A.M every remaining day, creates incremental backup files of their database(s) between 10 minutes before and 10 minutes after every hour from 6:00 A.M. until 6:00 P.M., and also creates transaction log backup files for their database(s) between 3 minutes before and 3 minutes after every 15 minutes (but not including on the hour when incremental backup files are created) from 6:00 A.M. until 6:00 P.M.

Using a transaction log backup file to restore a data object to a specified time can require applying the most recent full backup file prior to the specified time, applying the most recent differential backup file prior to the specified time, applying the most recent incremental backup file(s) prior to the specified time, and/or applying each of the transaction log backup files since the most recent backup file through the most recent transaction backup file prior to the specified time. For example, if on Saturday September $21^{st}$ a database administrator requests a restoration of a client's database to its state on Thursday September $19^{th}$ at 9:15 A.M., a backup/restore application identifies the client's full backup file created at 1:00 A.M. on Monday September $16^{th}$, the client's differential backup file created at 1:30 A.M. on Thursday September $19^{th}$, the client's 3 incremental backup files created at 7:04 A.M, 7:58 A.M, and 9:06 A.M. on September $19^{th}$, and the client's transaction log backup file created at 9:15 A.M. on September $19^{th}$. Although the preceding examples describe the creation of backup files that occurs on a weekly, daily, hourly, and every 15 minutes basis, the frequency for the creation of backup files may be based on any time period, such as seconds, minutes, hours, days, weeks, months, or years.

A data object can be a group of information that is backed up as a unit, such as the information for a computer or a network of computers. A data object may be stored on a storage array, which can be a disk-based retention system that includes multiple disk drives. Unlike a disk enclosure, a storage array has cache memory and advanced functionality, such as virtualization and Redundant Array of Independent Disks (RAID). A data protection administrator can manage a backup/restore application to create backups files of data objects and store the backup files of data objects on multiple storage arrays.

In any given data backup system, hundreds to thousands of data backup jobs may be executed on a daily basis to generate backup copies of data stored by any number of clients. The success or failure of these data backup jobs depends on many factors, including the client that is having its data backed up, the network used for backing up the data, the storage system that retains the backup data, the amount of the data that is backed up, the day of the week (such as a weekend day or a weekday) that the data is backed up, and the day of the month (such as the last day of a month) that the data is backed up. These success and failure factors also include the policies for backing up the data, which incorporates the type of backup job (such as a full backup, a differential backup, an incremental backup, or a transaction log backup), the frequency and schedule of the backup, the data set type (such as structured data or unstructured data) of the backup, and the backup method used (such as streaming backup or block-based backup).

Data management environments will experience failures in the data backup system. The health of the data backup system depends on a human operator's ability to investigate failed data backup jobs and resolve any failures identified in the data backup system. In a typical data backup system, a percentage of data backup jobs may fail on any given day. For example, if on average only 5 percent of the 20,000 data backup jobs in a large data management environment fail each day, then 1,000 data backup jobs (5 percent of the 20,000 jobs) will typically fail every day. Some existing solutions for data backup job failures can create a report that identifies the data backup jobs that failed, while other solutions can use statistical approaches to count the most recent data backup job failures to create a report that estimates the probabilities of the data backup jobs failing. Since a human operator has the capacity to investigate and possibly remediate only a limited number of data backup jobs each day, such as 100 of the 1,000 data backup jobs that failed the previous day, the operator needs to draw conclusions from such reports to plan which data backup jobs will be investigated and possibly remediated prior to the next backup window.

Planning which data backup jobs to investigate can be more complicated than simply investigating as many of the data backup jobs that failed the previous day. For example, if a first client has an error in its backup/restore application that creates a failure in its data backup job when writing a backup to a target system, then a second client which has no error in its backup/restore application may experience a failure in its data backup job when writing a backup to the target system that is still experiencing a failure due to the error in the first client's backup/restore application. If an operator selects to investigate the first client's failed data backup job, then the operator can remediate the error in the first client's backup/restore application. However, if the operator selected to investigate the second client's failed data backup job instead, the operator cannot identify or remediate the error in the first client's backup/restore application. Consequently, the selections of which failed data backup jobs to investigate, such as selecting which 100 of the 1,000 failed data backup jobs, determines whether or not the operator is efficient at remediating failures, because a failed data backup job may not be the source of its own failure.

For the purposes of the following examples, after the operator remediates a failed data backup job, then the data backup job will not fail again. For example, the operator will remediate on average 50 out of the 100 data backup jobs that are investigated per day. Continuing this example of the large data management environment, to bring the data backup system into health the operator needs 400 days (20,000 data backup jobs each day divided by 50 remediated data backup jobs per day), which is more than a year. A customer who is responsible for the data management environment may consider the process of remediating only half of the data backup jobs that failed as an inefficient process that still requires significant human effort, and consider a remediation time that lasts more than a year as creating a risk for the customer's data.

BRIEF DESCRIPTION OF THE DRAWINGS

FIGS. 2A-C illustrate block diagrams of example timelines for applying machine-learning to optimize the operational efficiency of data backup systems, under an embodiment;

DETAILED DESCRIPTION

Embodiments herein apply machine-learning to optimize the operational efficiency of data backup systems. A machine-learning system creates a training set of multiple features for each of multiple historical data backup jobs. The machine-learning system trains a prediction model to use the training set to predict the probabilities that the corresponding historical data backup jobs failed during the next historical data backup window. The machine-learning system creates an operational set of multiple features for each of multiple scheduled data backup jobs. The trained prediction model uses the operational set to predict the probabilities that the corresponding scheduled data backup jobs will fail during the next scheduled data backup window. The predicted probability that a scheduled data backup job will fail during the next scheduled data backup window is output, thereby enabling an operator to remediate the scheduled data backup job prior to the next scheduled data backup window.

For example, a machine-learning system creates a training set of features from 20,000 historical data backup jobs, and then uses the training set to train a prediction model to predict the probabilities that the 20,000 historical data backup jobs failed during the next historical data backup window. The machine-learning system creates an operational set of features from 20,000 scheduled data backup jobs. The trained prediction model uses the operational set to predict the probabilities that the 20,000 scheduled data backup jobs will fail during the next scheduled data backup window, and then outputs the predictions for the 100 scheduled data backup jobs that have the highest predicted probabilities of failure. Since 95 of these 100 scheduled data backup jobs actually need remediation, the operator remediates 95 out of the 100 data backup jobs which the operator investigates. Since the prediction model generates and outputs predictions that identify on average 95 scheduled data backup jobs that need remediation each day, the operator now needs only 211 days (20,000 data backup jobs each day divided by 95 remediated data backup jobs per day) to bring the data backup environment into health and reach the optimal state in the shortest possible time. The machine-learning system significantly reduces the risk of losing the customer's data, and also halves the human effort required to remediate most of the data backup job failures prior to these failures occurring again.

Figure 1:
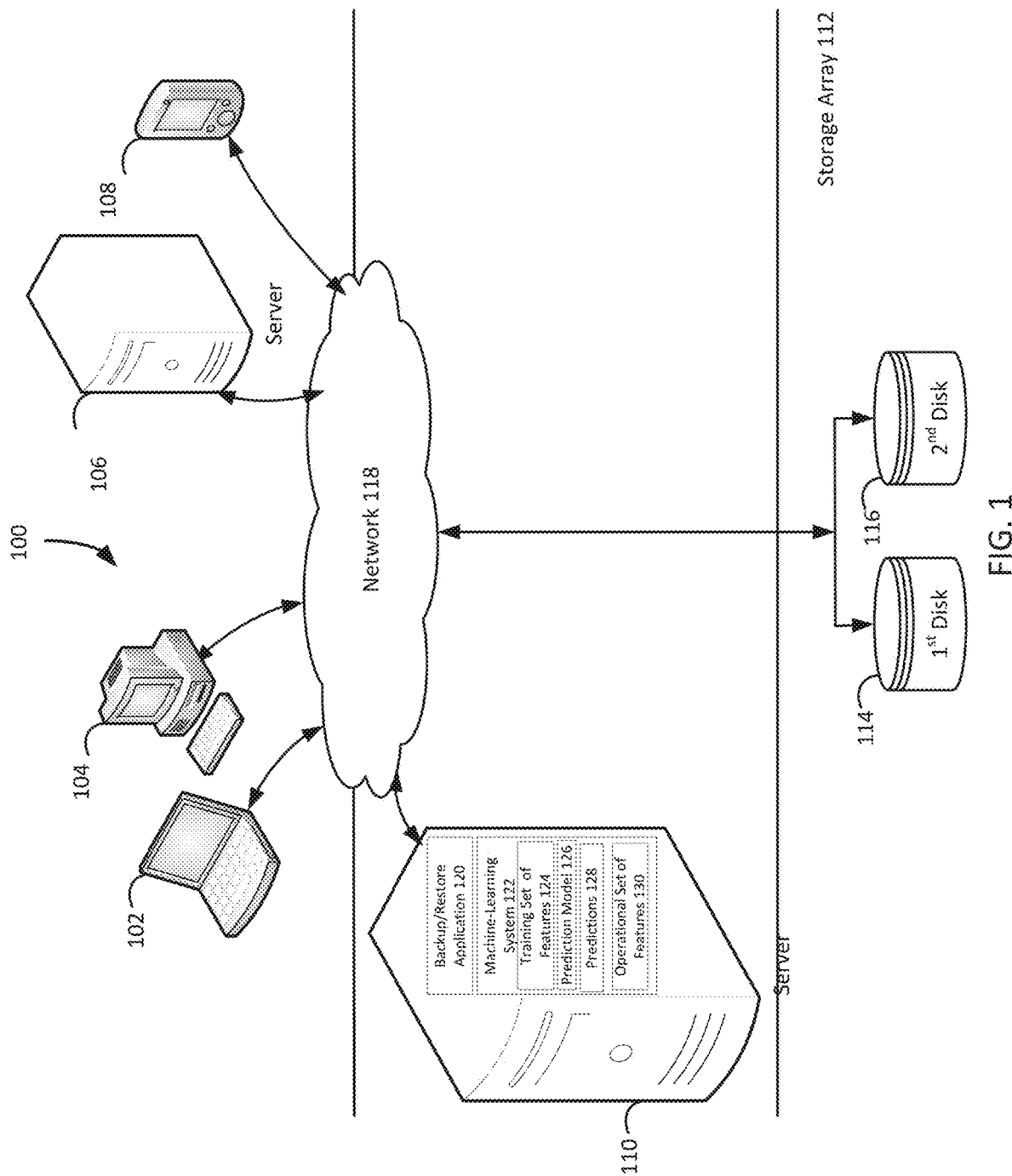
FIG. 1 illustrates a block diagram of an example system for applying machine-learning to optimize the operational efficiency of data backup systems, under an embodiment.

FIG. 1 illustrates a diagram of a system 100 for applying machine-learning to optimize the operational efficiency of data backup systems, under an embodiment. As shown in FIG. 1, the system 100 may illustrate a cloud computing environment in which data, applications, services, and other resources are stored and delivered through shared data centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, a third client 106, and a fourth client 108; and a server 110, and a storage array 112 that may be provided by a hosting company. Although FIG. 1 depicts the first client 102 as a laptop computer 102, the second client 104 as a personal computer 104, the third client 106 as a server 106, and the fourth client 108 as a smartphone 108, each of the clients 102-108 may be any type of computer. The storage array 112 includes a first disk 114 and a second disk 116. The clients 102-108, the server 110, and the storage array 112 communicate via a network 118. Although FIG. 1 depicts the system 100 with four clients 102-108, one server 110, one storage array 112, two disks 114-116, and one network 118, the system 100 may include any number of clients 102-108, any number of servers 110, any number of storage arrays 112, any number of disks 114-116, and any number of networks 118. The clients 102-108 and the server 110 may each be substantially similar to the system 400 depicted in FIG. 4 and described below.

The server 110, which may be referred to as a backup server 110, includes a backup/restore application 120 that can create backup files of data objects for the clients 102-108, and execute a restore based on the backup files stored on the storage array 112. The backup/restore application 120 can provide centralized administration, such as scheduling, monitoring, and managing backup operations and backup files. The backup/restore application 120 can enable the storing of backup operation schedules, client policies, and client configurations. The backup/restore application 120 can provide a unique interface to the clients 102-108 during login, and also assist the backup server 110 in authenticating and registering the clients 102-108. The backup/restore application 120 can send backup/restore work orders to the clients 102-108, which can receive and process the work orders to start a backup or restore operation. The backup/restore application 120 can maintain a local database of all processes that execute on the backup server 110. The backup/restore application 120 can execute server-side processes for a system administrator's graphical management console, which may enable the system administrator to use command line interface tools for queries. For example, a system administrator identifies the clients 102-108 registered with the backup server 110.

The server 110 can also include a machine-learning system 122, which can include a training set of features 124, a prediction model 126, predictions 128, and an operational set of features 130. The machine-learning system 122 can be interconnected computer parts that study algorithms and statistical models to perform a specific task by relying on patterns and inference instead of using explicit instructions. The training set of features 124 can be a group of things' distinctive attributes that are used to teach a particular type of behavior through practice and instruction over a period of time. The prediction model 126 can be a generated conceptual or mathematical representation of a behavior that creates forecasts. Predictions 128 can be forecasts. The operational set of features 130 can be a group of things' distinctive attributes that are related to the routine functioning and activities of a business or organization.

Although FIG. 1 depicts the backup/restore application 120 and the machine-learning system 122 residing completely on the backup server 110, the backup/restore application 120 and/or the machine-learning system 122 may reside in any combination of partially on the backup server 110, partially on the clients 102-108, such as by residing as data management applications on the clients 102-108, and partially on another server which is not depicted in FIG. 1. Even though the following paragraphs describe EMC Corporation's Power Protect® backup/restore application, EMC Corporation's NetWorker® backup/restore application, and EMC Corporation's Avamar® backup/restore application as examples of the backup/restore application 120, the backup/restore application 120 may be any other type of backup/restore application which provides the backup/restore functionalities described in the Background section. Even though the following paragraphs describe EMC Corporation's Data Domain as an example of the backup server 110, the backup server 110 may be any other type of backup server which provides the backup/restore functionalities described in the Background section.

The backup/restore application 120 may be an EMC Corporation's Power Protect® backup/restore application, which supports Microsoft SQL/Exchange/DB2/Oracle/SAP Oracle/SAP HANA/Filesystem/Hadoop and ProtectPoint solutions. The backup/restore application 120 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data may be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

The backup/restore application 120 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for an immediate single step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic checks of data systems ensure recoverability whenever needed. EMC Corporation's Avamar® systems may be deployed in an integrated solution with EMC Corporation's Data Domain® systems for high-speed backup and recovery of specific data types.

The backup server 110 may be an EMC Corporation's Data Domain server. The Data Domain operating system delivers scalable, high-speed, and cloud-enabled protection storage for backup, archive, and disaster recovery. Data Domain employs variable-length deduplication to minimize disk requirements and to ensure data lands on a disk that is already deduplicated, thereby reducing backup and archive storage requirements, and making disk a cost-effective alternative to tape. Deduplicated data may be stored onsite, for immediate restores and longer-term retention on disk, and replicated over a wide area network to a remote site or a service provider site in the cloud for disaster recovery operations, eliminating the need for tape-based backups or for consolidating tape backups to a central location. Data Domain provides the capability to consolidate both backup and archive data on the same infrastructure, thereby eliminating silos of backup and archive storage and associated overhead. Inline write and read verification protects against and automatically recovers from data integrity issues during data ingest and retrieval. Capturing and correcting I/O errors inline during the backup and archiving process eliminates the need to repeat backup and archive jobs, ensuring backups and archiving complete on time and satisfy service-level agreements. In addition, unlike other enterprise arrays or file systems, continuous fault detection and self-healing ensures data remains recoverable throughout its lifecycle on Data Domain. End-to-end data verifications reads data after it is written and compares it to what was sent to disk, proving that it is reachable through the file system to disk and that the data is not corrupted.

The machine-learning system 122 learns which features of historical data backup jobs should be included in the training set of features 124 that will be created to train the prediction model 126 to makes predictions 128 of whether each of the historical data backup jobs failed or succeeded in backing up its data during the next historical data backup window. Since the machine-learning system 122 learns by observing these features of data backup jobs over time, the machine-learning system 122 learns to adapt to different customer environments and to changes within a customer's environment. The machine-learning system 122 can learn to include any feature of historical data backup jobs in the training set of features 124 and learn to assign any combinations of weights to these features. A training set can be a group of things that are used to teach a particular type of behavior through practice and instruction over a period of time. A feature can be a distinctive attribute of a thing. A historical data backup job can be a task that previously created an extra copy of computer information.

The training set of features 124 of data backup jobs can include a unique client identifier, a grouping of clients, a plugin name, a dataset, a schedule, a retention policy, a client operating system, a client operating system version, encryption settings, a target, and a last result. A data backup job can be a task that creates an extra copy of computer information. A unique client identifier can be a sequence of characters used to refer to a single computer that obtains resources and/or services from a server computer. A grouping of clients can be a set of computers that obtain resources and/or services from any number of server computers and that are backed up together. A plugin name can be a type of data that is backed up, such as a virtual machine, a database, or a filesystem. A dataset can be a list of information that is being backed up. A schedule can be a timetable for backing up data, such as hourly, daily, weekly, or monthly. A retention policy can be a plan for the duration of time that backup data is stored. A client operating system can be the software that supports the basic functions of a computer that obtains resources and/or services from a server computer. A client operating system version can be a particular release of the software that supports the basic functions of a computer that obtains resources and/or services from a server computer. Encryption settings can be the type of a process for converting data into a code and whether this conversion is enabled. A target can be where a data backup is written, such as Data Domain or Avamar Datastore. A last result can be the most recent success or failure of a data backup job at creating and storing an extra copy of computer data.

Since most data backup systems execute more data backup jobs that are successful than data backup jobs that fail, the machine-learning system 122 can adjust for this class imbalance by using random oversampling of under-represented classes, which are typically data backup job failures. Using random oversampling, the machine-learning system 122 can automatically adjust the number of data backup jobs that fail and have features included in the training set of features 124 to be equal to the number of example data backup jobs that succeed and have features included in the training set of features 124. If the machine-learning system 122 does not adjust for this class imbalance, the over-represented class of features from successful data backup jobs may result in training the prediction model 126 to be more accurate at predicting successful data backup jobs, while the under-represented class of features from failed data backup jobs may result in training the prediction model 126 to be less accurate at predicting failed data backup jobs, Since the purpose of the prediction model 126 is to accurately predict failed data backup jobs, the trade-off in accuracies created by adjusting for the class imbalance may be beneficial. An imbalance can be a lack of an equal relationship between corresponding things. A number can be an arithmetical value that represents a particular quantity and is used in counting The machine-learning system 122 can use the features which represent the successes and failures of the historical data backup jobs during a number N of sliding historical data backup job windows to train the prediction model 126 (or multiple prediction models) to achieve optimal predictions 128. Through cyclical training, the machine-learning system 122 learns the optimal number of N sliding data backup windows for the prediction mode 126 to accurately predict failures of scheduled data backup jobs. To maximize the accuracy of the prediction model 126 predicting failures of data backup jobs, the machine-learning system 122 can evaluate different numbers of N sliding data backup windows using an optimization method, such as hill climbing, gradient descent, or simulated annealing. A data backup job window can be a time interval for a task to create an extra copy of computer information.

The machine-learning system 122 determines to what extent different numbers of N sliding data backup windows are evaluated based on tradeoffs between available data, evaluation metrics (prediction accuracy, precision, recall, training time, etc.) and the desired amount of time that an operator needs to remediate data backup jobs. For example, the machine-learning system 122 learns to use the 3 most recent data backup windows to train the prediction model 126 because using the 4 most recent data backup windows resulted in lowering the accuracy of predicting failures due to stale features that were recorded in the $4^{th}$ most recent data backup window, and using the 2 most recent data backup windows resulted in lowering the accuracy of predicting failures due to an insufficient amount of features recorded in the 2 most recent data backup windows. In a complementary example, if an operator needs 8 hours per day to remediate data backup jobs, and the data backup window spans 12 hours, then the machine-learning system 122 trains the prediction model 126 to execute up to 4 hours of prediction execution time in a prediction window to predict the probabilities of failure for the scheduled data backup jobs. Combining these last two examples, the machine-learning system 122 learns to use the 3 most recent data backup windows to train the prediction model 126 to be optimal for a combination of executing within a 4 hours prediction window and accurately predicting failures of data backup jobs. Prediction accuracy can be the quality of a forecast being correct. Prediction execution time can be an interval when a computer generates a forecast. A prediction window can be a time interval for generating a forecast. A probability can be the likelihood of something being the case. A combination can be a joining of different elements in which the component elements are individually distinct.

Figure 2A:
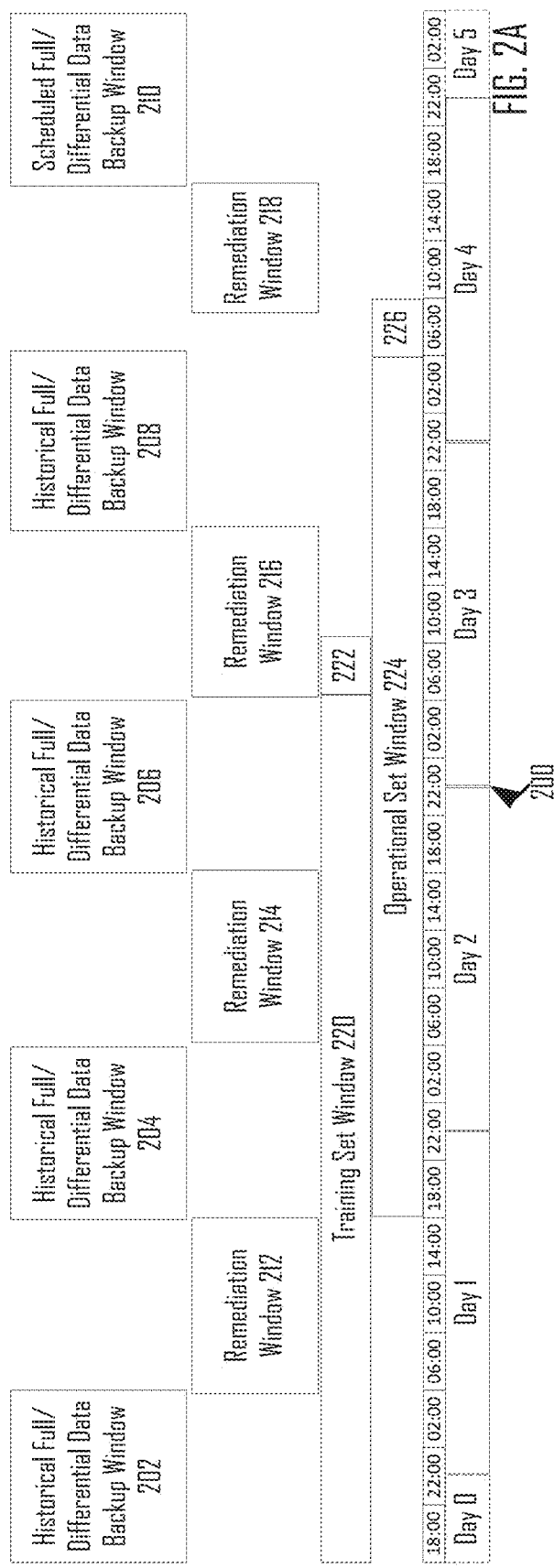

FIG. 2A depicts a timeline 200 that illustrate the training and prediction process for full and/or differential backup files. The timeline 200 includes historical full/differential data backup windows 202-208, and a scheduled full/differential data backup window 210, during which full and/or differential data backup jobs are executed by the clients 102-108 and/or the server 110. The timeline 200 also includes remediation windows 212-218, which represent the time that an operator has to investigate and remediate full/differential data backup jobs. The timeline 200 additionally includes a training set window 220 when features were recorded from historical full/differential data backup jobs during the N most recent data backup windows. The machine-learning system 122 uses these features to train the prediction model 126 to predict, during a prediction window 222, the probabilities that the historical full/differential data backup jobs failed during the next historical data backup window. A next historical data backup window can be the subsequent time interval for a task that created an extra copy of computer information.

After the machine-learning system 122 sufficiently trains the prediction model 126, the machine-learning system 122 identifies the full/differential data backup jobs that are scheduled to be executed in the next scheduled full/differential data backup window. The timeline 200 additionally includes an operational set window 224 when features were recorded from the scheduled full/differential data backup jobs during the N most recent full/differential data backup windows. Then the machine-learning system 122 applies the prediction model 126 to the operational set of features 130, which represent the successes and failures of the scheduled full/differential data backup jobs over the last N full/differential data backup windows, to make predictions 128, during the prediction window 226, of the probability of failure for each of these scheduled full/differential data backup jobs. A scheduled data backup job can be a task that is planned to create an extra copy of computer information. A next scheduled data backup window can be a planned time interval for a task to create an extra copy of computer information.

The machine-learning system 122 outputs a prediction report to an operator, showing a subset the full/differential data backup jobs scheduled to be executed in the next scheduled full/differential data backup window, with the subset of full/differential data backup jobs listed in a decreasing order of predicted failure probabilities that begin with the full/differential data backup job that has the highest predicted probability of failure. The report provides predictions 126 that enable the operator to focus remediation activities on full/differential data backup jobs that are most likely to fail prior to their impending full/differential data backup window. A predicted probability can be the likelihood of a forecast being the case. An operator can be a person who uses a computer. A decreasing order can be the arrangement of things that become smaller in size in relation to each other. A subset can be a part of a larger group of related things.

For an example of the training and prediction processes for full/differential data backup jobs, the machine-learning system 122 creates the training set of features 124 from 20,000 historical full/differential data backup jobs by learning the optimal number of N full/differential data backup windows for the prediction mode 126 to accurately predict the probabilities of full/differential data backup job failures. First, the machine-learning system 122 uses the 4 most recent historical full/differential data backup windows, which are the historical full/differential data backup window 202, the historical full/differential data backup window 204, the historical full/differential data backup window 206, and the historical full/differential data backup window that precedes the historical full/differential data backup window 202 but is not depicted in FIG. 2A, to train the prediction model 126. Next, the machine-learning system 122 uses the 3 most recent historical full/differential data backup windows, which are the historical full/differential data backup window 202, the historical full/differential data backup window 204, and the historical full/differential data backup window 206, to train the prediction model 126. Then the machine-learning system 122 uses the 2 most recent historical full/differential data backup windows, which are the historical full/differential data backup window 204 and the historical full/differential data backup window 206, to train the prediction model 126.

Using the 4 most recent historical full/differential data backup windows to train the prediction model 126 results in a 90% accuracy in predicting the probabilities that the 20,000 historical full/differential data backup jobs failed during the next historical data backup window, which is the historical full/differential data backup window 208. Using the 3 most recent historical full/differential data backup windows to train the prediction model 126 results in a 96% accuracy in predicting the probabilities that the 20,000 historical full/differential data backup jobs failed during the next historical data backup window. Using the 2 most recent historical full/differential data backup windows to train the prediction model 126 results in a 93% accuracy in predicting the probabilities that the 20,000 historical full/differential data backup jobs failed during the historical full/differential data backup window 208. Since the highest accuracy of 96% in predicting the probabilities that the historical full/differential data backup jobs failed during the next historic full/differential data backup window was a result of using the 3 most recent historical full/differential data backup windows to train the prediction model 126, the machine-learning system 122 learns to use the 3 most recent historical full/differential data backup windows to train the prediction model 126. This learning is reflected in the training set window 220, which includes the 3 most recent historical full/differential data backup windows, which are the historical full/differential data backup window 202, the historical full/differential data backup window 204, and the historical full/differential data backup window 206.

The machine-learning system 122 learns that using the 4 most recent historical full/differential data backup windows resulted in lowering the accuracy of predicting failures due to stale features that were recorded in the $4^{th}$ most recent historical full/differential data backup window, and using the 2 most recent historical full/differential data backup windows resulted in lowering the accuracy of predicting failures due to an insufficient amount of features recorded in the 2 most recent historical full/differential data backup windows. Although this example describes the machine-learning system 122 experimenting with 3 different values of N (4, 3, and 2) for the number of most recent historical full/differential data backup windows to create a single training set window 220 to train the prediction model 126, the machine-learning system 122 can experiment with any number of different values of N for the number of most recent historical full/differential data backup windows to create any number of training set windows to train the prediction model 126.

Since the machine-learning system 122 learned to use the 3 most recent historical full/differential data backup windows to train the prediction model 126, the machine-learning system 122 creates the operational set of features 130 from each of the 20,000 scheduled full/differential data backup jobs that executed during the 3 most recent historical full/differential data backup windows, which is reflected in the operational set window 224 that includes the historical full/differential data backup window 204, the historical full/differential data backup window 206, and the historical full/differential data backup window 208. Next, the trained prediction model 126 uses the operational set of features 130 recorded during the operational set window 224 to predict, during the prediction window 226, the probabilities that the 20,000 scheduled full/differential data backup jobs will fail during the next scheduled full/differential data backup window, which is the scheduled full/differential data backup window 210.

Since the full/differential data backup windows 202-210 depicted by FIG. 2A cover the 12 hours from 6:00 P.M. to 6:00 A.M. on a daily basis, and the remediation windows 212-218 cover the 8 hours from 10:00 A.M. to 6:00 P.M. each day, each of the prediction windows 222 and 226 cover the 4 hours from 6:00 A.M to 10:00 A.M each day after the optimal amount of features have been recorded from each of the historical full/differential data backup jobs that executed during the learned number of historical full/differential data backup windows. Since the trained prediction model 126 needs to use the operational set of features 130 to generate the predictions 128 during the prediction window 226 that covers only the 4 hours from 6:00 A.M to 10:00 A.M, the machine-learning system 122 trains the trained prediction model 126 to use the training set of features 124 to generate the predictions 128 during the prediction window 222 that covers the 4 hours from 6:00 A.M to 10:00 A.M. Consequently, the trained prediction model 126 is optimized to generate the predictions 128 during the prediction window 226 that covers only the 4 hours from 6:00 A.M to 10:00 A.M, Then the machine-learning system 122 outputs the predictions 128 for the 100 scheduled full/differential data backup jobs that have the highest predicted probabilities of failure. Since 95 of these 100 scheduled full/differential data backup jobs actually need remediation, the operator remediates 95 out of the 100 full/differential data backup jobs which the operator investigates during the remediation window 218. Since the prediction model 126 generates and outputs the predictions 128 that identify on average 95 scheduled full/differential data backup jobs that need remediation each day, the operator now needs only 211 days (20,000 full/differential data backup jobs each day divided by 95 remediated full/differential data backup jobs per day) to bring the data backup environment into health and reach the optimal state in the shortest possible time. In contrast, during the remediation windows 212-216 that preceded the prediction window 226 and the remediation window 218, the operator was only able to remediate on average 50 scheduled full/differential data backup jobs that need remediation each day, such that the operator previously needed 400 days (20,000 full/differential data backup jobs each day divided by 50 remediated full/differential data backup jobs per day) to bring the data backup environment into health. The machine-learning system 122 significantly reduces the risk of losing the customer's data, and also halves the human effort required to remediate most of the full/differential data backup job failures prior to these failures occurring again.

FIG. 2B depicts a timeline 230 that illustrate the training and prediction process for incremental data backup jobs. The timeline 230 includes historical incremental data backup windows 232-238, and a scheduled incremental data backup window 240, during which incremental data backup jobs are executed by the clients 102-108 and/or the server 110. The timeline 230 also includes remediation windows 242-248, which represent some of the time that an operator has to investigate and remediate incremental data backup jobs. The timeline 230 additionally includes a training set window 250 when features were recorded from historical incremental data backup jobs during the N most recent incremental data backup windows. The machine-learning system 122 uses these features to train the prediction model 126 to predict, during a prediction window 252, the probabilities that the historical incremental data backup jobs failed during the next historical incremental data backup window.

After the machine-learning system 122 sufficiently trains the prediction model 126, the machine-learning system 122 identifies the incremental data backup jobs that are scheduled to be executed in the next scheduled incremental data backup window. The timeline 230 additionally includes an operational set window 254 when features were recorded from the scheduled incremental data backup jobs during the N most recent incremental data backup windows. Then the machine-learning system 122 applies the prediction model 126 to the operational set of features 130, which represent the successes and failures of the scheduled incremental data backup jobs over the last N incremental data backup windows, to make predictions 128, during a prediction window 256, of the probability of failure for each of these scheduled incremental data backup jobs.

The machine-learning system 122 outputs a prediction report to an operator, showing a subset the incremental data backup jobs scheduled to be executed in the next scheduled incremental data backup window, with the subset of incremental data backup jobs listed in a decreasing order of predicted failure probabilities that begin with the incremental data backup job that has the highest predicted probability of failure. The report provides predictions 126 that enable the operator to focus remediation activities on incremental data backup jobs that are most likely to fail prior to their impending incremental data backup window.

For example, the machine-learning system 122 trains the prediction model 126 to predict the probabilities that 1,000 incremental data backup jobs will fail during the next incremental data backup window. In contrast to the previous example that described 20,000 full/differential data backup jobs, the large data management environment may execute only 1,000 incremental data backup jobs on an hourly basis for the relatively few datasets that a system administrator has identified as being important enough to warrant hourly backups. The machine-learning system 122 creates the training set of features 124 from 1,000 historical incremental data backup jobs by learning the optimal number of N incremental data backup windows for the prediction mode 126 to accurately predict the probabilities of incremental data backup job failures. First, the machine-learning system 122 uses the 4 most recent historical incremental data backup windows, which are the historical incremental data backup window 232, the historical incremental data backup window 234, the historical incremental data backup window 236, and the historical incremental data backup window that precedes the historical incremental data backup window 232 but is not depicted in FIG. 2B, to train the prediction model 126. Next, the machine-learning system 122 uses the 3 most recent historical incremental data backup windows, which are the historical incremental data backup window 232, the historical incremental data backup window 234, and the historical incremental data backup window 236, to train the prediction model 126. Then the machine-learning system 122 uses the 2 most recent historical incremental data backup windows, which are the historical incremental data backup window 234 and the historical incremental data backup window 236, to train the prediction model 126.

Using the 4 most recent historical incremental data backup windows to train the prediction model 126 results in an 89% accuracy in predicting the probabilities that the 1,000 historical incremental data backup jobs failed during the next historical incremental data backup window, which is the historical incremental data backup window 238. Using the 3 most recent historical incremental data backup windows to train the prediction model 126 results in a 95% accuracy in predicting the probabilities that the 1,000 historical incremental data backup jobs failed during the next historical incremental data backup window. Using the 2 most recent historical incremental data backup windows to train the prediction model 126 results in a 92% accuracy in predicting the probabilities that the 1,000 historical incremental data backup jobs failed during the historical incremental data backup window 238. Since the highest accuracy of 95% in predicting the probabilities of the historical incremental data backup jobs that failed during the next historical incremental data backup job was the result of using the 3 most recent historical incremental data backup windows to train the prediction model 126, the machine-learning system 122 learns to use the 3 most recent historical incremental data backup windows to train the prediction model 126. This learning is reflected in the training set window 250, which includes the 3 most recent historical incremental data backup windows, which are the historical incremental data backup window 232, the historical incremental data backup window 234, and the historical incremental data backup window 236.

The machine-learning system 122 learns that using the 4 most recent historical incremental data backup windows resulted in lowering the accuracy of predicting failures due to stale features that were recorded in the $4^{th}$ most recent historical incremental data backup window, and using the 2 most recent historical incremental data backup windows resulted in lowering the accuracy of predicting failures due to an insufficient amount of features recorded in the 2 most recent historical incremental data backup windows. Although this example describes the machine-learning system 122 experimenting with 3 different values of N (4, 3, and 2) for the number of most recent historical incremental data backup windows to create a single training set window 250 to train the prediction model 126, the machine-learning system 122 can experiment with any number of different values of N for the number of most recent historical incremental data backup windows to create any number of training set windows to train the prediction model 126.

Since the machine-learning system 122 learned to use the 3 most recent historical incremental data backup windows to train the prediction model 126, the machine-learning system 122 creates the operational set of features 130 from each of the 1,000 scheduled incremental data backup jobs that executed during the 3 most recent historical incremental data backup windows, which is reflected in the operational set window 254 that includes the historical incremental data backup window 234, the historical incremental data backup window 236, and the historical incremental data backup window 238. Next, the trained prediction model 126 uses the operational set of features 130 recorded during the operational set window 254 to predict, during the prediction window 256, the probabilities that the 1,000 scheduled incremental data backup jobs will fail during the next scheduled incremental data backup window, which is the scheduled incremental data backup window 240.

Since each of the incremental data backup windows 232-240 depicted by FIG. 2B cover the 20 minutes from 10 minutes before to 10 minutes after an hour, and each of the remediation windows 242-248 cover the 30 minutes prior to an hourly incremental data backup window, each of the prediction windows 252 and 256 cover the 10 minutes after the optimal amount of features have been recorded from each of the historical incremental data backup jobs that executed during the learned number of historical incremental data backup windows. Since the trained prediction model 126 needs to use the operational set of features 130 to generate the predictions 128 during the prediction window 256 that covers only 10 minutes, the machine-learning system 122 trains the trained prediction model 126 to use the training set of features 124 to generate the predictions 128 during the prediction window 252 that covers 10 minutes.

Consequently, the trained prediction model 126 is optimized to generate the predictions 128 during the prediction window 256 that covers only 10 minutes, which is possible because the predictions 128 are based on features for only 1,000 incremental data backup jobs, compared to the prediction window 226 that covers 240 minutes based on features for 20,000 full/differential data backup jobs.

Then the machine-learning system 122 outputs the predictions 128 for the 5 scheduled incremental data backup jobs that have the highest predicted probabilities of failure. Since approximately 4 to 5 of these 5 scheduled incremental data backup jobs actually need remediation, the operator remediates on average 4.7 out of the 5 incremental data backup jobs which the operator investigates during the remediation window 248 that covers only 30 minutes. Such an investigation is possible because the operator investigates only 5 incremental data backup jobs, compared to the remediation window 218 that covers 480 minutes during which the operator investigated 100 full/differential data backup jobs. In contrast, during each of the remediation windows 242-246 that preceded the prediction window 256 and the remediation window 248, the operator was only able to remediate on average 2.5 of 5 scheduled incremental data backup jobs that need remediation. The machine-learning system 122 significantly reduces the risk of losing the customer's data, and also reduces the human effort required to remediate many of the incremental data backup job failures prior to these failures occurring again.

Figure 2C:
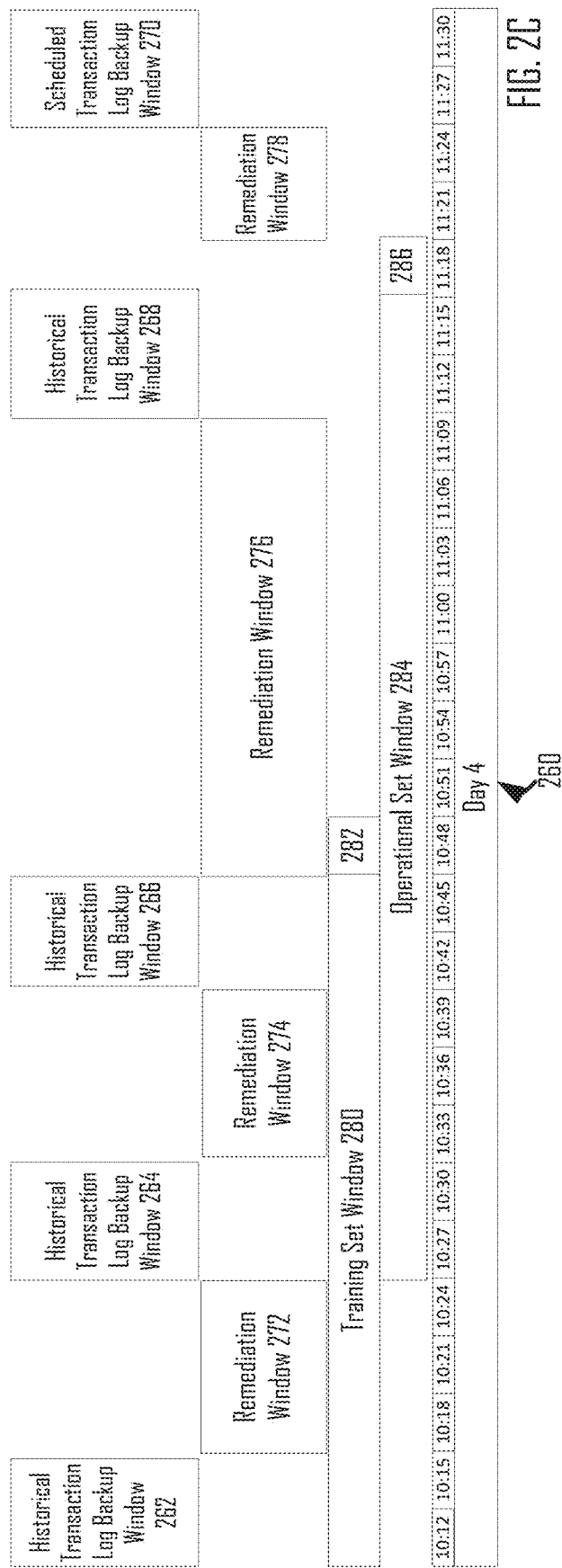

FIG. 2C depicts a timeline 260 that illustrate the training and prediction process for transaction log backup jobs. The timeline 260 includes historical transaction log backup windows 262-268, and a scheduled transaction log backup window 270, during which transaction log backup jobs are executed by the clients 102-108 and/or the server 110. The historical transaction log backup windows occur every 15 minutes, such as the historical transaction log backup window 262 from 10:12 A.M. to 10:18 A.M., the historical transaction log backup window 264 from 10:27 A.M. to 10:33 A.M. and the historical transaction log backup window 266 from 10:42 A.M. to 10:48 A.M. However, the historical transaction log backup windows do not occur on an hour, such as when the historical incremental data backup window 232 is from 10:50 A.M. to 11:10 A.M., but resumes 15 minutes after the hour, such as the historical transaction log backup window 268 from 11:12 A.M. to 11:18 A.M. If the data backup system did not include hourly incremental data backup jobs, a historical transaction log backup window would have occurred from 10:57 A.M. to 11:03 A.M. The timeline 260 also includes remediation windows 272-278, which represent some of the time that an operator has to investigate and remediate transaction log backup jobs. The timeline 260 additionally includes a training set window 280 when features were recorded from historical transaction log backup jobs during the N most recent transaction log backup windows. The machine-learning system 122 uses these features to train the prediction model 126 to predict, during a prediction window 282, the probabilities that the historical transaction log backup jobs failed during the next historical transaction log backup window.

After the machine-learning system 122 sufficiently trains the prediction model 126, the machine-learning system 122 identifies the transaction log backup jobs that are scheduled to be executed in the next scheduled transaction log backup window. The timeline 260 additionally includes an operational set window 284 when features were recorded from the scheduled transaction log backup jobs during the N most recent transaction log backup windows. Then the machine-learning system 122 applies the prediction model 126 to the operational set of features 130, which represent the successes and failures of the scheduled transaction log backup jobs over the last N transaction log data backup windows, to make predictions 128, during the prediction window 286, of the probability of failure for each of these scheduled transaction log backup jobs.

The machine-learning system 122 outputs a prediction report to an operator, showing a subset the transaction log backup jobs scheduled to be executed in the next scheduled transaction log backup window, with the subset of transaction log backup jobs listed in a decreasing order of failure probabilities that begin with the transaction log backup job that has the highest predicted probability of failure. The report provides predictions 126 that enable the operator to focus remediation activities on transaction log backup jobs that are most likely to fail prior to their impending transaction log backup window.

For example, the machine-learning system 122 trains the prediction model 126 to predict the probabilities that 250 transaction log backup jobs will fail during the next transaction log backup window. In contrast to the previous example that described 20,000 full/differential data backup jobs and 1,000 incremental data backup jobs, the large data management environment may execute only 250 transaction log backup jobs every 15 minutes for the relatively few datasets that a system administrator has identified as being important enough to warrant backups every 15 minutes. The machine-learning system 122 creates the training set of features 124 from 250 historical transaction log backup jobs by learning the optimal number of N transaction log backup windows for the prediction mode 126 to accurately predict the probabilities of transaction log backup job failures. First, the machine-learning system 122 uses the 4 most recent historical transaction log backup windows, which are the historical transaction log backup window 262, the historical transaction log backup window 264, the historical transaction log backup window 266, and the historical transaction log backup window that precedes the historical transaction log backup window 262 but is not depicted in FIG. 2C, to train the prediction model 126. Next, the machine-learning system 122 uses the 3 most recent historical transaction log backup windows, which are the historical transaction log backup window 262, the historical transaction log backup window 264, and the historical transaction log backup window 266, to train the prediction model 126. Then the machine-learning system 122 uses the 2 most recent historical transaction log backup windows, which are the historical transaction log backup window 264 and the historical transaction log backup window 266, to train the prediction model 126.

Using the 4 most recent historical transaction log backup windows to train the prediction model 126 results in an 88% accuracy in predicting the probabilities that the 250 historical transaction log backup jobs failed during the next historical transaction log backup window, which is the historical transaction log backup window 268. Using the 3 most recent historical transaction log backup windows to train the prediction model 126 results in a 94% accuracy in predicting the probabilities that the 250 historical transaction log backup jobs failed during the next historical transaction log backup window. Using the 2 most recent historical transaction log backup windows to train the prediction model 126 results in a 91% accuracy in predicting the probabilities that the 250 historical transaction log backup jobs failed during the historical transaction log backup window 268. Since the highest accuracy of 94% in predicting the probabilities of the historical transaction log backup jobs that failed in the next historical transaction log backup window was a result of using the 3 most recent historical transaction log backup windows to train the prediction model 126, the machine-learning system 122 learns to use the 3 most recent historical transaction log backup windows to train the prediction model 126. This learning is reflected in the training set window 280, which includes the 3 most recent historical transaction log backup windows, which are the historical transaction log backup window 262, the historical transaction log backup window 264, and the historical transaction log backup window 266.

The machine-learning system 122 learns that using the 4 most recent historical transaction log backup windows resulted in lowering the accuracy of predicting failures due to stale features that were recorded in the $4^{th}$ most recent historical transaction log backup window, and using the 2 most recent historical transaction log backup windows resulted in lowering the accuracy of predicting failures due to an insufficient amount of features recorded in the 2 most recent historical transaction log backup windows. Although this example describes the machine-learning system 122 experimenting with 3 different values of N (4, 3, and 2) for the number of most recent historical transaction log backup windows to create a single training set window 280 to train the prediction model 126, the machine-learning system 122 can experiment with any number of different values of N for the number of most recent historical transaction log backup windows to create any number of training set windows to train the prediction model 126.

Since the machine-learning system 122 learned to use the 3 most recent historical transaction log backup windows to train the prediction model 126, the machine-learning system 122 creates the operational set of features 130 from each of the 250 scheduled transaction log backup jobs that executed during the 3 most recent historical transaction log backup windows, which is reflected in the operational set window 284 that includes the historical transaction log backup window 264, the historical transaction log backup window 266, and the historical transaction log backup window 268. Next, the trained prediction model 126 uses the operational set of features 130 recorded during the operational set window 284 to predict, during the prediction window 286, the probabilities that the 250 scheduled transaction log backup jobs will fail during the next scheduled transaction log backup window, which is the scheduled transaction log backup window 270.

Since each of the transaction log backup windows 262-270 depicted by FIG. 2C covers the 6 minutes from 3 minutes before to 3 minutes after a 15 minute interval, and each of the remediation windows 272-278 covers the 6 minutes prior to each transaction log backup window, each of the prediction windows 282 and 286 covers the 3 minutes after the optimal amount of features have been recorded from each of the historical transaction log backup jobs that executed during the learned number of historical transaction log backup windows. Since the trained prediction model 126 needs to use the operational set of features 130 to generate the predictions 128 during the prediction window 286 that covers only 3 minutes, the machine-learning system 122 trains the trained prediction model 126 to use the training set of features 124 to generate the predictions 128 during the prediction window 282 that covers 3 minutes. Consequently, the trained prediction model 126 is optimized to generate the predictions 128 during the prediction window 286 that covers only 3 minutes, which is possible because the predictions 128 are based on features for only 250 transaction log backup jobs, compared to the prediction window 256 that covers 10 minutes based on features for 1,000 incremental data backup jobs, and the prediction window 226 that covers 240 minutes based on features for 20,000 full/differential data backup jobs.

Then the machine-learning system 122 outputs the predictions 128 for the 2 scheduled transaction log backup jobs that have the highest predicted probabilities of failure. Since approximately 1 to 2 of these 2 scheduled transaction log backup jobs actually need remediation, the operator remediates on average 1.8 out of the 2 transaction log backup jobs which the operator investigates during the remediation window 248 that covers only 6 minutes. This 6 minute investigation is possible because the operator investigates only 2 transaction log backup jobs, compared to the remediation window 248 that covers 30 minutes during which the operator investigated 5 incremental data backup jobs, and the remediation window 218 that covers 480 minutes during which the operator investigated 100 full/differential data backup jobs. In contrast, during each of the remediation windows 272-276 that preceded the prediction window 286 and the remediation window 278, the operator was only able to remediate on average 1.0 of 2 scheduled transaction log backup jobs that need remediation. The machine-learning system 122 significantly reduces the risk of losing the customer's data, and also reduces the human effort required to remediate many of the transaction log backup job failures prior to these failures occurring again.

Figure 3:
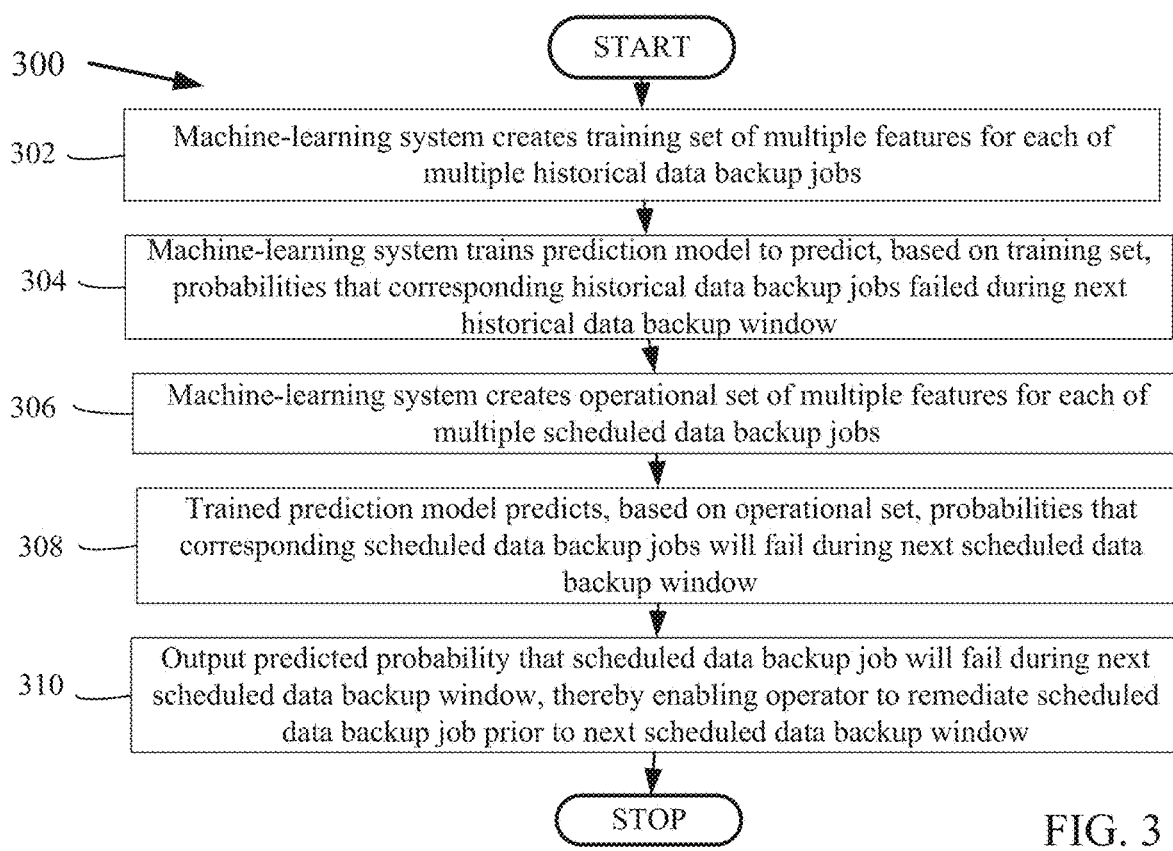
FIG. 3 is a flowchart that illustrates a method of applying machine-learning to optimize the operational efficiency of data backup systems, under an embodiment.

FIG. 3 is a flowchart that illustrates a method for applying machine-learning to optimize the operational efficiency of data backup systems, under an embodiment. Flowchart 300 illustrates method acts illustrated as flowchart blocks for certain steps involved in and/or between the clients 102-108 and/or the server 110 of FIG. 1.

A machine-learning system creates a training set of multiple features for each of multiple historical data backup jobs, block 302. The system creates a training set to train the prediction model to predict data backup job failures. For example, and without limitation, this can include the machine-learning system 122 creating the training set of features 124 from 20,000 historical full/differential data backup jobs.

After creating the training set, the machine-learning system trains a prediction model to use the training set to predict the probabilities that the historical data backup jobs failed during the next historical data backup window, block 304. The system trains the prediction model to predict data backup job failures. By way of example and without limitation, this can include the machine-learning system 122 using the training set of features 124 to train the prediction model 126 to predict the probabilities that the 20,000 historical full/differential data backup jobs failed during the next historical full/differential data backup window Following the training of the prediction model, the machine-learning system creates an operational set of multiple features for each of multiple scheduled data backup jobs, block 306. The system creates an operational set for the prediction model to use to predict failures of scheduled data backup jobs. In embodiments, this can include the machine-learning system 122 creating the operational set of features 130 from 20,000 scheduled full/differential data backup jobs.

Having created the operational set and trained the prediction model, the trained prediction model uses the operational set to predict the probabilities that the scheduled data backup jobs will fail during the next scheduled data backup window, block 308. The system predicts the failures of scheduled data backup jobs. For example, and without limitation, this can include the trained prediction model 126 using the operational set of features 130 to predict the probabilities that the 20,000 scheduled full/differential data backup jobs will fail during the next scheduled full/differential data backup window.

After predicting probabilities of scheduled data backup job failures, the predicted probability that a scheduled data backup job will fail during the next scheduled data backup window is output, thereby enabling an operator to remediate the scheduled data backup job prior to the next scheduled data backup window, block 310. The system outputs predictions of scheduled data backup job failures that an operator can use to remediate these predicted failures. By way of example and without limitation, this can include the machine-learning system 122 outputting the predictions 128 for the 100 scheduled full/differential data backup jobs that have the highest predicted probabilities of failure. Since 95 of these 100 scheduled full/differential data backup jobs actually need remediation, the operator remediates 95 out of the 100 full/differential data backup jobs which the operator investigates. Since the prediction model 126 generates and outputs the predictions 128 that identify on average 95 scheduled full/differential backup jobs that need remediation each day, the operator now needs only 211 days (20,000 full/differential data backup jobs each day divided by 95 remediated full/differential data backup jobs per day) to bring the data backup environment into health and reach the optimal state in the shortest possible time. The machine-learning system significantly reduces the risk of losing the customer's data, and also halves the human capital required to remediate most of the full/differential data backup job failures prior to these failures occurring again.

Although FIG. 3 depicts the blocks 302-310 occurring in a specific order, the blocks 302-310 may occur in another order. In other implementations, each of the blocks 302-310 may also be executed in combination with other blocks and/or some blocks may be divided into a different set of blocks.

Figure 4:
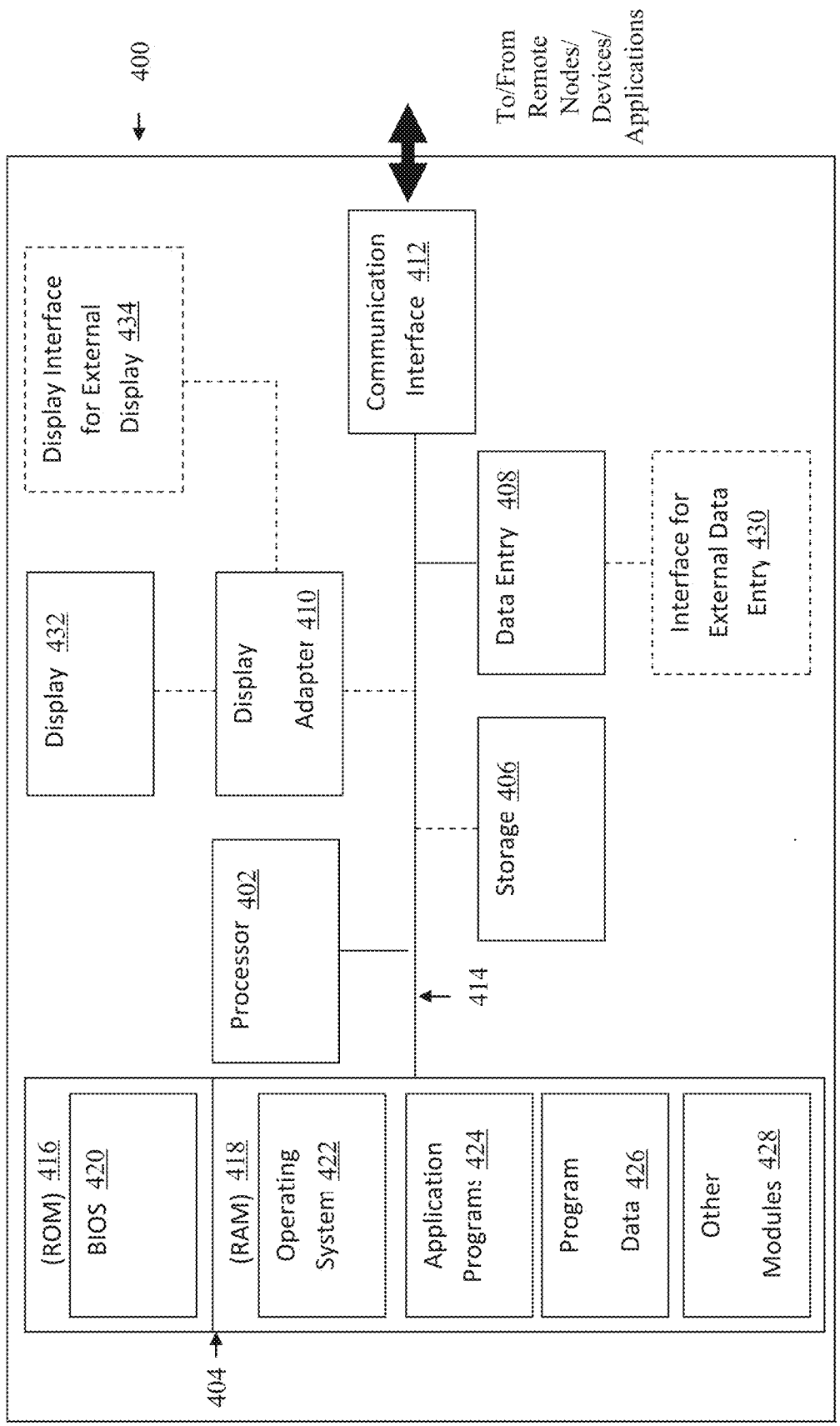
FIG. 4 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 4 may vary depending on the system implementation. With reference to FIG. 4, an exemplary system for implementing the subject matter disclosed herein includes a hardware device 400, including a processing unit 402, memory 404, storage 406, a data entry module 408, a display adapter 410, a communication interface 412, and a bus 414 that couples the elements 404-412 to the processing unit 402.

The bus 414 may comprise any type of bus architecture. Examples include a memory bus, a peripheral bus, a local bus, etc. The processing unit 402 is an instruction execution machine, apparatus, or device and may comprise a microprocessor, a digital signal processor, a graphics processing unit, an application specific integrated circuit (ASIC), a field programmable gate array (FPGA), etc. The processing unit 402 may be configured to execute program instructions stored in the memory 404 and/or the storage 406 and/or received via the data entry module 408.

The memory 404 may include read only memory (ROM) 416 and random access memory (RAM) 418. The memory 404 may be configured to store program instructions and data during operation of the hardware device 400. In various embodiments, the memory 404 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 404 may also include nonvolatile memory technologies such as nonvolatile flash RAM (NVRAM) or ROM. In some embodiments, it is contemplated that the memory 404 may include a combination of technologies such as the foregoing, as well as other technologies not specifically mentioned. When the subject matter is implemented in a computer system, a basic input/output system (BIOS) 420, containing the basic routines that help to transfer information between elements within the computer system, such as during start-up, is stored in the ROM 416.

The storage 406 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 400.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 406, the ROM 416 or the RAM 418, including an operating system 422, one or more applications programs 424, program data 426, and other program modules 428. A user may enter commands and information into the hardware device 400 through the data entry module 408. The data entry module 408 may include mechanisms such as a keyboard, a touch screen, a pointing device, etc. Other external input devices (not shown) are connected to the hardware device 400 via an external data entry interface 430. By way of example and not limitation, external input devices may include a microphone, joystick, game pad, satellite dish, scanner, or the like. In some embodiments, external input devices may include video or audio input devices such as a video camera, a still camera, etc. The data entry module 408 may be configured to receive input from one or more users of the hardware device 400 and to deliver such input to the processing unit 402 and/or the memory 404 via the bus 414.

A display 432 is also connected to the bus 414 via the display adapter 410. The display 432 may be configured to display output of the hardware device 400 to one or more users. In some embodiments, a given device such as a touch screen, for example, may function as both the data entry module 408 and the display 432. External display devices may also be connected to the bus 414 via an external display interface 434. Other peripheral output devices, not shown, such as speakers and printers, may be connected to the hardware device 400.

The hardware device 400 may operate in a networked environment using logical connections to one or more remote nodes (not shown) via the communication interface 412. The remote node may be another computer, a server, a router, a peer device or other common network node, and typically includes many or all of the elements described above relative to the hardware device 400. The communication interface 412 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 412 may include logic configured to support direct memory access (DMA) transfers between the memory 404 and other devices.

In a networked environment, program modules depicted relative to the hardware device 400, or portions thereof, may be stored in a remote storage device, such as, for example, on a server. It will be appreciated that other hardware and/or software to establish a communications link between the hardware device 400 and other devices may be used.

It should be understood that the arrangement of the hardware device 400 illustrated in FIG. 4 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 400.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 4.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for machine-learning that optimizes data backup systems' operational efficiency, comprising:
   one or more processors; and
   a non-transitory computer readable medium storing a plurality of instructions, which when executed, cause the one or more processors to:
   create, by a machine-learning system, a training set comprising a plurality of features for each of a plurality of historical data backup jobs;
   train, by the machine-learning system, a prediction model to predict, based on the training set, a plurality of probabilities that the corresponding plurality of historical data backup jobs failed during a next historical data backup window;
   create, by the machine-learning system, an operational set comprising a plurality of features for each of a plurality of scheduled data backup jobs
   predict, by the trained prediction model, based on the operational set, a plurality of probabilities that the corresponding plurality of scheduled data backup jobs will fail during a next scheduled data backup window; and output a predicted probability that a scheduled data backup job will fail during the next scheduled data backup window, thereby enabling an operator to remediate the scheduled data backup job prior to the next scheduled data backup window.

2. The system of claim 1, wherein the plurality of features comprises at least two of a unique client identifier, a grouping of clients, a plugin name, a dataset, a schedule, a retention policy, a client operating system, a client operating system version, encryption settings, a target, and a last result that are associated with a corresponding data backup job.

3. The system of claim 1, wherein the training set comprising the plurality of features for each of the plurality of historical data backup jobs is adjusted for an imbalance between a plurality of features for a number of historical data backup jobs that succeeded and a plurality of features for a number of historical data backup jobs that failed.

4. The system of claim 1, wherein the plurality of features in the training set was recorded during a number of data backup windows for each of the plurality of historical data backup jobs, and the plurality of features in the operational set comprises was recorded during the number of data backup windows for each of the plurality of scheduled data backup jobs.

5. The system of claim 4, wherein the number of data backup windows is learned by the machine-learning system as optimal for prediction accuracy by the prediction model.

6. The system of claim 4, wherein the number of data backup windows is learned by the machine-learning system as optimal for a prediction execution time by the prediction model during a prediction window.

7. The system of claim 1, wherein outputting the predicted probability that the scheduled data backup job will fail during the next scheduled data backup window comprises outputting a plurality of predictions of a plurality of probabilities that a subset of the corresponding plurality of scheduled data backup jobs will fail during the next scheduled data backup window, the subset of the plurality of scheduled data backup jobs being listed based on a decreasing order of the corresponding plurality of probabilities.

8. A computer-implemented method for applying machine-learning to optimize the operational efficiency of data backup systems, the computer-implemented method comprising:

creating, by a machine-learning system, a training set comprising a plurality of features for each of a plurality of historical data backup jobs;

training, by the machine-learning system, a prediction model to predict, based on the training set, a plurality of probabilities that the corresponding plurality of historical data backup jobs failed during a next historical data backup window;

creating, by the machine-learning system, an operational set comprising a plurality of features for each of a plurality of scheduled data backup jobs predicting, by the trained prediction model, based on the operational set, a plurality of probabilities that the corresponding plurality of scheduled data backup jobs will fail during a next scheduled data backup window; and outputting a predicted probability that a scheduled data backup job will fail during the next scheduled data backup window, thereby enabling an operator to remediate the scheduled data backup job prior to the next scheduled data backup window.

9. The computer-implemented method of claim 8, wherein the plurality of features comprises at least two of a unique client identifier, a grouping of clients, a plugin name, a dataset, a schedule, a retention policy, a client operating system, a client operating system version, encryption settings, a target, and a last result that are associated with a corresponding data backup job.

10. The computer-implemented method of claim 8, wherein the training set comprising the plurality of features for each of the plurality of historical data backup jobs is adjusted for an imbalance between a plurality of features for a number of historical data backup jobs that succeeded and a plurality of features for a number of historical data backup jobs that failed.

11. The computer-implemented method of claim 8, wherein the plurality of features in the training set was recorded during a number of data backup windows for each of the plurality of historical data backup jobs, and the plurality of features in the operational set comprises was recorded during the number of data backup windows for each of the plurality of scheduled data backup jobs.

12. The computer-implemented method of claim 11, wherein the number of data backup windows is learned by the machine-learning system as optimal for prediction accuracy by the prediction model.

13. The computer-implemented method of claim 11, wherein the number of data backup windows is learned by the machine-learning system as optimal for a prediction execution time by the prediction model during a prediction window.

14. The computer-implemented method of claim 8, wherein outputting the predicted probability that the scheduled data backup job will fail during the next scheduled data backup window comprises outputting a plurality of predictions of a plurality of probabilities that a subset of the corresponding plurality of scheduled data backup jobs will fail during the next scheduled data backup window, the subset of the plurality of scheduled data backup jobs being listed based on a decreasing order of the corresponding plurality of probabilities.

15. A computer program product, comprising a non-transitory computer-readable medium having a computer-readable program code embodied therein to be executed by one or more processors, the program code including instructions to:

create, by a machine-learning system, a training set comprising a plurality of features for each of a plurality of historical data backup jobs;

train, by the machine-learning system, a prediction model to predict, based on the training set, a plurality of probabilities that the corresponding plurality of historical data backup jobs failed during a next historical data backup window;

create, by the machine-learning system, an operational set comprising a plurality of features for each of a plurality of scheduled data backup jobs predict, by the trained prediction model, based on the operational set, a plurality of probabilities that the corresponding plurality of scheduled data backup jobs will fail during a next scheduled data backup window; and output a predicted probability that a scheduled data backup job will fail during the next scheduled data backup window, thereby enabling an operator to remediate the scheduled data backup job prior to the next scheduled data backup window.

16. The computer program product of claim 15, wherein the plurality of features comprises at least two of a unique client identifier, a grouping of clients, a plugin name, a dataset, a schedule, a retention policy, a client operating system, a client operating system version, encryption settings, a target, and a last result that are associated with a corresponding data backup job.

17. The computer program product of claim 15, wherein the training set comprising the plurality of features for each of the plurality of historical data backup jobs is adjusted for an imbalance between a plurality of features for a number of historical data backup jobs that succeeded and a plurality of features for a number of historical data backup jobs that failed.

18. The computer program product of claim 15, wherein the plurality of features in the training set was recorded during a number of data backup windows for each of the plurality of historical data backup jobs, and the plurality of features in the operational set comprises was recorded during the number of data backup windows for each of the plurality of scheduled data backup jobs.

19. The computer program product of claim 18, wherein the number of data backup windows is learned by the machine-learning system as optimal for a combination of prediction accuracy by the prediction model and a prediction execution time by the prediction model during a prediction window.

20. The computer program product of claim 15, wherein outputting the predicted probability that the scheduled data backup job will fail during the next scheduled data backup window comprises outputting a plurality of predictions of a plurality of probabilities that a subset of the corresponding plurality of scheduled data backup jobs will fail during the next scheduled data backup window, the subset of the plurality of scheduled data backup jobs being listed based on a decreasing order of the corresponding plurality of probabilities.

* * * * *